April 7, 1959　　　　J. E. ELLISON　　　　2,880,484
STRIPPER PIN ASSEMBLY
Filed April 28, 1958　　　　　　　　　　3 Sheets-Sheet 1
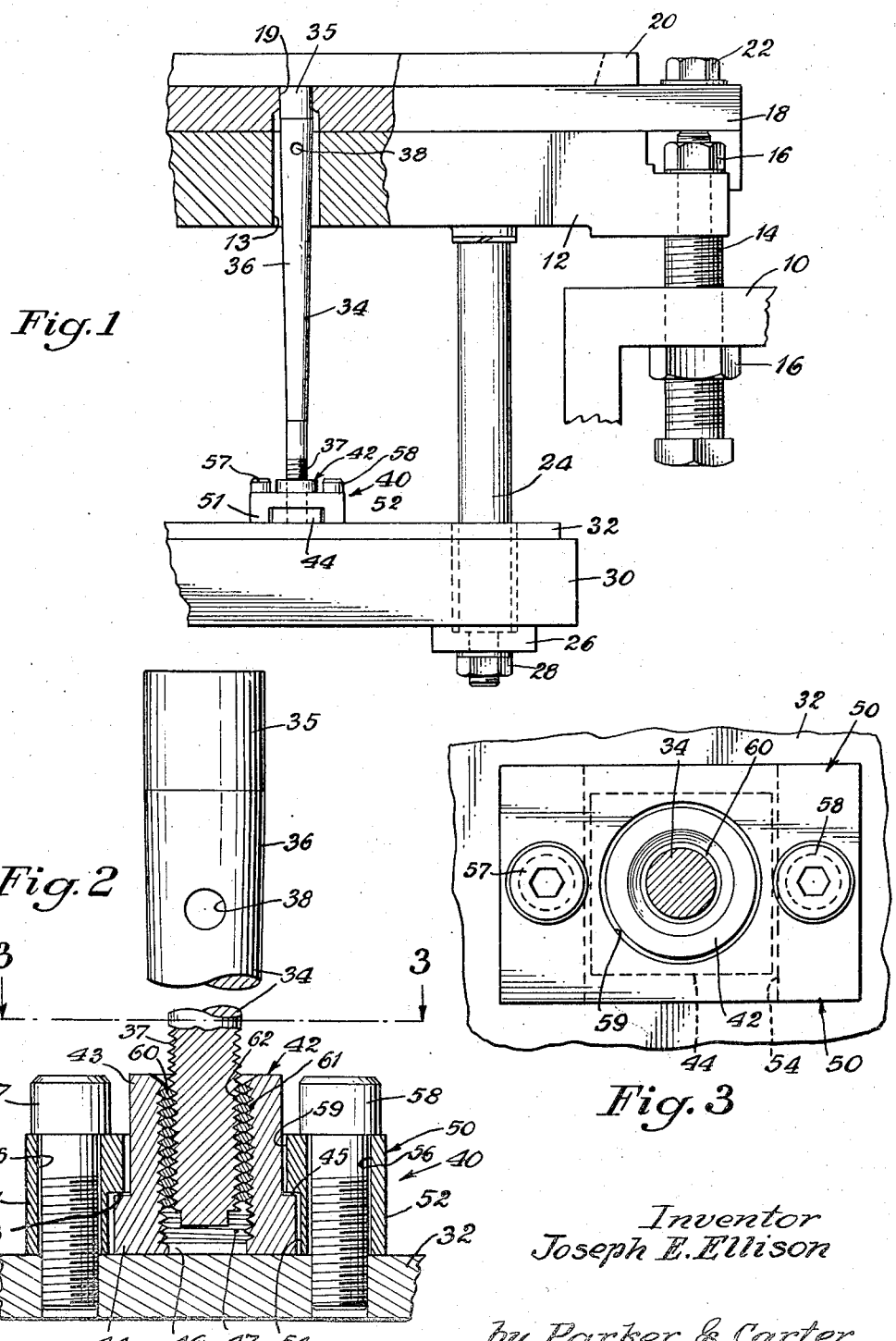
Inventor
Joseph E. Ellison
by Parker & Carter
Attorneys

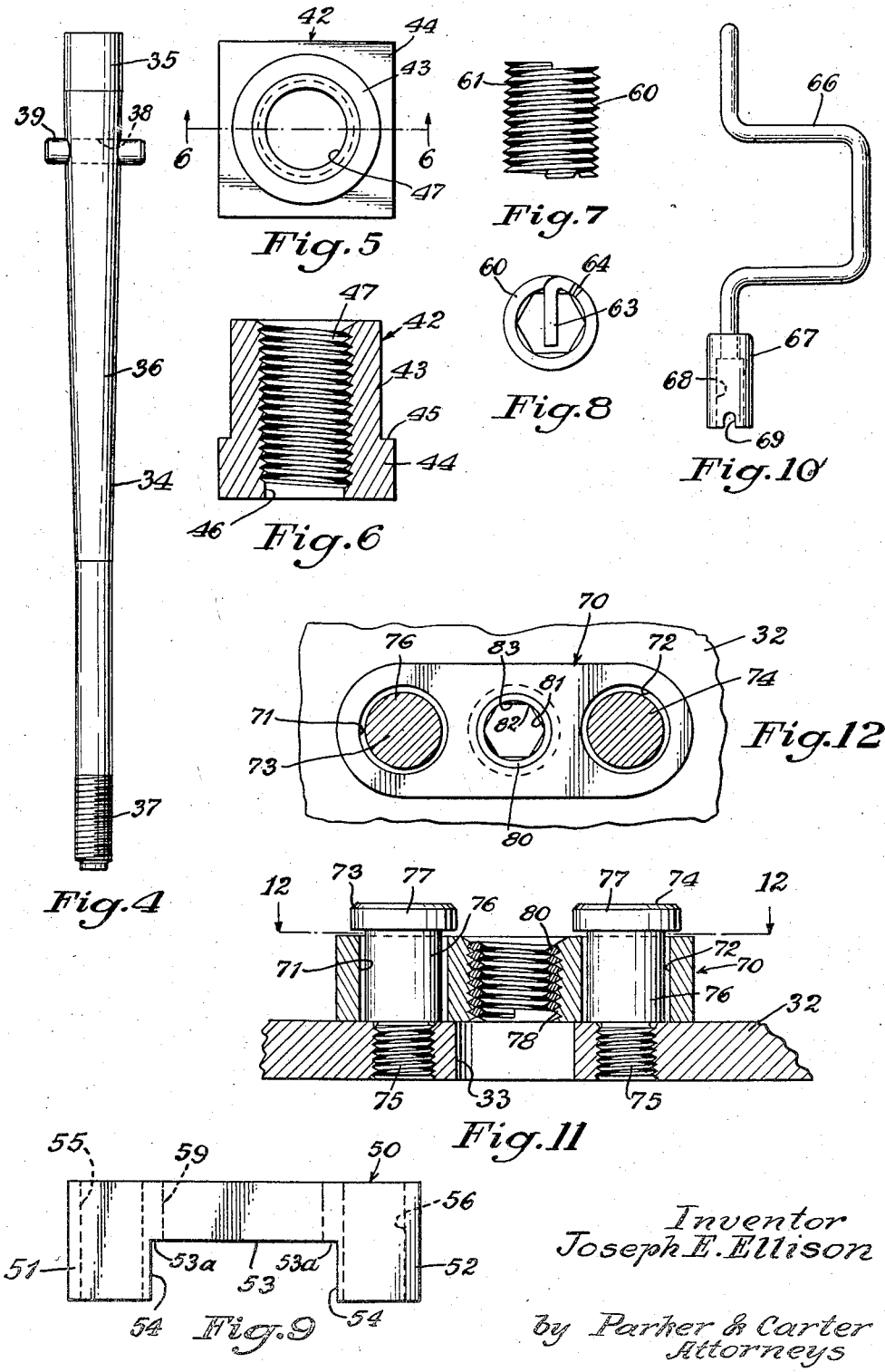

April 7, 1959 J. E. ELLISON 2,880,484
STRIPPER PIN ASSEMBLY
Filed April 28, 1958 3 Sheets-Sheet 3

Inventor
Joseph E. Ellison by Parker & Carter
Attorneys

United States Patent Office 2,880,484
Patented Apr. 7, 1959

2,880,484

STRIPPER PIN ASSEMBLY

Joseph E. Ellison, Amherst, Ohio, assignor to Standard Screw Company, Bellwood, Ill., a corporation of Illinois Application April 28, 1958, Serial No. 731,306

24 Claims. (Cl. 22—94)

My invention relates to the molding and casting art and is specifically directed to the problem of removing cast or molded objects from their forming surfaces.

Accordingly, a primary object of my invention is the provision of a novel ejector or stripper assembly whereby either cast or molded articles may be quickly and easily separated from their forming surfaces.

Another major object is the provision of a stripper pin assembly in which the stripper pin may float with respect to the supporting structure to which it is mounted.

Another object is the provision of a stripper pin assembly whereby variations in alignment of a stripper pin from its predetermined position due to expansion, warpage, and other factors may be easily compensated for.

Another object is the provision of a stripper pin assembly in which a stripper pin is carried by an adjustable stripper pin base which in turn is adjustably mounted on a base carrying member.

A further object is the provision of an ejector or stripper pin assembly which may be used in either permanent mold casting, plastic injection molding, shell molding or any other process in which dies or forming surfaces are subjected to heat great enough to cause expansion and warpage of the ejector mechanisms.

Yet another object is the provision of an ejector or core pin assembly which may be used in either permanent mold casting, plastic injection molding, shell molding or any other process in which dies or forming surfaces are utilized in the production of cast or molded objects.

Another object is the provision of a new and improved stripper pin which may be easily and accurately adjusted longitudinally with respect to its supporting structure.

Another object is the provision of a stripper pin assembly which is simple to manufacture, easy to assemble and low in manufacturing cost.

Other objects will become apparent from time to time throughout the course of the ensuing specification.

I illustrate my invention more or less diagrammatically in the following illustrations, wherein:

Figure 1 is a partial view of a shell molding machine with my stripper pin assembly mounted beneath the pattern plate;

Figure 2 is a sectional view of the stripper pin base assembly shown in Figure 1;

Figure 3 is a view along line 3—3 of Figure 2;

Figure 4 is an elevation of the stripper pin of Figure 1;

Figure 5 is a plan view of the stripper pin base;

Figure 6 is a sectional view taken along line 6—6 of Figure 5;

Figure 7 is an elevation of a coil insert adapted to be received within the stripper pin base;

Figure 8 is a plan view of the coil insert of Figure 7;

Figure 9 is a stripper pin bracket;

Figure 10 is an adjusting wrench for varying the longitudinal position of the stripper pin;

Figure 11 is a variation showing a modified pin base assembly;

Figure 12 is a view along line 12—12 of Figure 11;

Like reference numerals will be used to designate similar parts throughout the following drawings.

Figure 14:
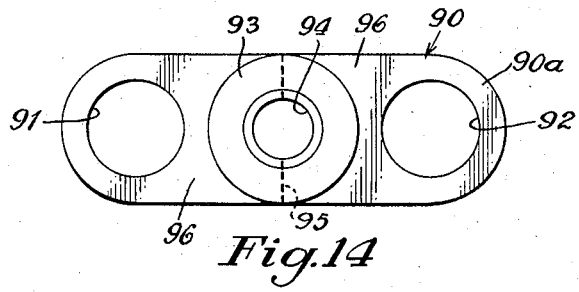
Figure 14 is a plan view of the pin base shown in Figure 13.

While it will be understod that my invention has many applications in the foundry field, it is particularly adapted for use in the die casting, plastic molding and shell molding processes. The invention could also be used in conjunction with core pins. For convenience, the invention is illustrated in connection with the shell molding process.

In this process either molds or cores are formed upon a heated metal pattern surface and are then baked and ejected preparatory to reception of molten metal. In general it will be understood that my stripper or ejector assembly is useful in all applications in which heat which could cause an expansion or warpage of the adjacent machine parts is utilized.

Referring particularly to Figures 1 through 9 I have shown in Figure 1 a typical pattern plate assembly in a shell molding machine. 10 indicates the roll-over frame of the machine and a standard adapter plate 12 having an aperture 13 is connected to the frame by any suitable means such as bolt 14 and securing nuts 16. A pattern plate 18 having an aperture 19 and a masking strip 20 is secured to the adapter plate by means of suitable bolts 22. Rigidly connected to the bottom of the adapter plate is a guide bolt 24 having a stop 26 which may be positioned by means of an adjustable bolt and washer arrangement 28. A stripper plate 30 and a pin base mounting plate 32 attached thereto are adapted to reciprocate along the guide bolts 24 as a unit between the lower surface of the adapter plate 12 and the stop 26. Secured to the mounting plate is a stripper pin 34 carried by a stripper pin base mounting assembly indicated generally at 40. The upper end of the pin is received in the registering apertures 13 and 19.

Referring now to Figures 2 through 6 and 9, my stripper pin base mounting assembly is shown in detail as including a stripper pin base 42 and a stripper pin bracket 50. The pin base has an elongated upper shank portion 43 and a lower base portion 44 forming a shoulder 45. The base is internally bored as at 46 and threaded as at 47 substantially the entire length of the bore.

The stripper pin bracket 50 includes a pair of projecting legs 51 and 52 with inner surfaces 54 joined by a flat portion 53. Bores 55 and 56 in the legs receive bolts 57 and 58 which secure the stripper pin bracket and the pin base to the pin base mounting plate 32. A main central bore 59 is formed between the bolt bores 55 and 56 for reception of the upper shank portion 43 of the stripper pin base. Internal shoulder 53a overhangs shoulder 45 on the pin base.

When the stripper pin base and the pin base bracket are assembled as in Figure 3 the heads of the bolts 57, 58 rigidly secure the bracket to the mounting plate 32, Bore 59 is somewhat larger than the diameter of the shank portion 43 of the pin base and the distance between the bracket legs 51 and 52 will be somewhat larger than the diameter of the lower portion 44 of the pin base. Similarly the distance between the shoulder 53a and the bottom surface of the legs 51, 52 will be slightly longer than the height of the lower portion 44 of the pin base.

When the parts are assembled as shown in Figure 2 there will always be a play or float in a lateral or sidewise direction between the pin base and the bracket. This floating action is due to the difference in diameter between the upper shank of the base and the main central bore of the bracket, and between the lower portion of the base and the legs of the bracket. The slight clearance between the overhanging shoulder of the bracket and the lower portion of the base prevents binding of the base to the mounting plate. The bores 55 and 56 in the bracket may be slightly larger than the bolts 57 and 58 to permit easy insertion and removal of the bolts.

Referring now to Figure 4, the stripper pin there shown includes head 35 and a shank portion 36 which may have a slight taper, and a lower threaded portion 37. It will be understood that the taper is optional. In Figures 2 and 4 I have shown a hole 38 extending transversely to the longitudinal axis of the pin near head 35 which is adapted to receive a drive pin 39. The pin is loosely received in the hole so as to be easily removed after wrenching.

The lower threaded portion 37 of the stripper pin is of a lesser diameter than the internal threaded bore 47 of the pin base. In order to hold the pin in tight engagement with the pin base I employ a coiled insert 60 as indicated in Figures 7 and 8. The insert has external threads 61 adapted for engagement with the internal threads 47 in the bore 46 and internal threads 62 for engagement with the external threads on the lower threaded portion of the stripper pin. A drive tang 63 is used to position the coil insert within the stripper pin base. After positioning, the tang is broken off along a line of weakness indicated at 64.

In Figure 10 I have shown a pin wrench used for adjusting the height of the stripper pin to compensate for changes in length due to expansion and warpage from the heat of the machine. The pin wrench may have any suitable handle 66, a head 67 having an internal bore 68 adapted to fit over the head 35 of the pin, and an indentation 69 adapted to fit over the drive pin 39.

In Figures 11 and 12 I have shown a modification of my invention. The pin base mounting plate 32 has a suitable hole 33 for reception of the lower end of the stripper pin. The stripper pin base and bracket have been combined into a base 70 having bores 71 and 72 for reception of bolts 73 and 74. The bolts have threaded portions 75, smooth shank portions 76 and heads 77. The diameter of the bores is slightly greater than the shank diameters of the bolts and the height of the base is slightly less than the axial length of the shank portions 76 to thereby permit the base to slide on the mounting plate. The pin base 70 could be mounted directly on the stripper plate 30 of the machine. If this is the case, the clearance hole 33 would be bored into the plate.

A coil insert 80 similar to the insert of Figure 7 is shown in position in the threaded bore 78 of the base. The external surface of the coil is generally smoothly threaded but at least one turn of the coil is deformed as at 81, 82, 83 so that as the threaded portion 37 of the stripper pin is screwed into the insert the threads on the stripper pin will expand the deformed portions of the helical coil. The pin is thus anchored at a plurality of pressure points along these turns of the thread in engagement with the deformed turns of the coil.

Figure 13:
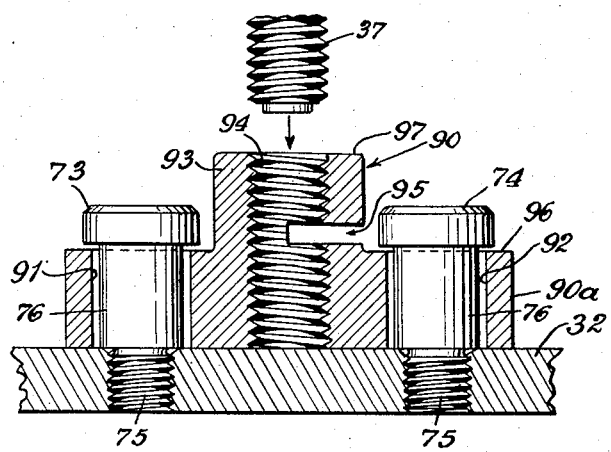
Figure 13 is another variation of a pin base assembly.

In Figures 13 and 14 I have shown another variation in which the coil insert is eliminated by a displacement of the axis of the threaded bore in the stripper pin base.

The base is indicated generally at 90 and includes bores 91 and 92 for the reception of bolts 73 and 74. The diameter of the bores is slightly greater than the diameter of the shank portions 76 of the bolts and the axial length of the bores is slightly less than the axial length of the shank portions. The stripper pin base 90 is formed with a projection 93 which is threaded as at 94 to receive the lower threaded end 37 of any suitable stripper pin. After tapping, a groove 95 is cut in the projection 93 near the surfaces 96. The projection 93 may then be pounded to cam the upper surface 97 with respect to the surface 96 to thereby displace the axis of that portion of the base below the groove 95. In effect, the threaded bore 94 is deformed so that when the stripper pin is screwed in to bore 94, the pin will make engagement with one or two threads in the lower portion 90a of the base and then the binding action will lock the stripper pin.

Figure 16:
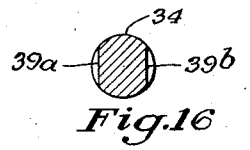
Figure 16 is a sectional view along line 16—16 in Figure 15.
Figure 15:
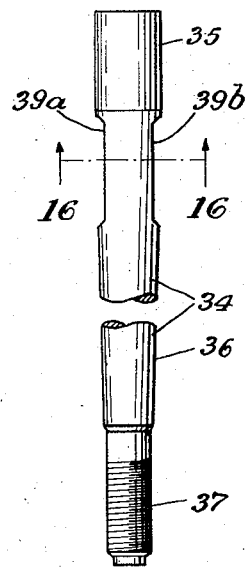
Figure 15 is another form of stripper pin usable with any of the bases shown in Figures 2, 11 or 13.
Figures 17, 18, 19:
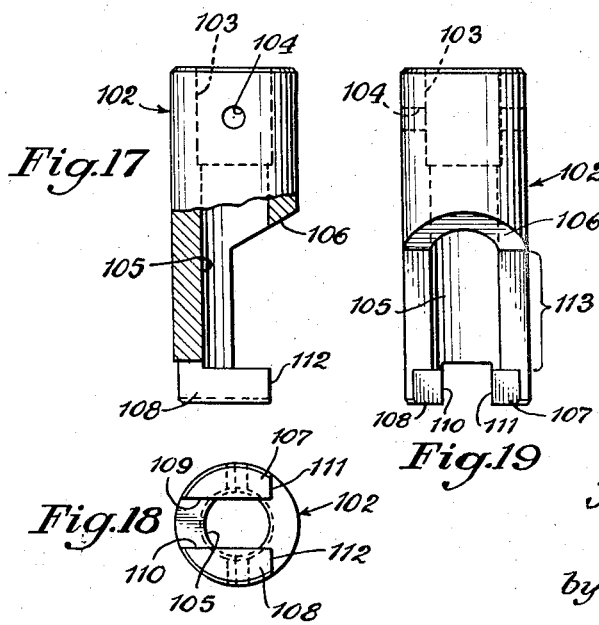
Figure 17 is an elevation of a wrench head partly in section.
Figure 18 is a bottom plan view of the wrench head shown in Figure 17.
Figure 19 is a front view of the wrench head of Figure 17.

In Figures 15 and 16 I have shown another form of stripper pin. In this instance a pair of parallel flats 39a and 39b have been milled on the exterior surface near the upper end of the pin.

In Figures 17 through 20 I have shown another form of pin wrench suitable for use with the milled flat stripper pin of Figure 15. The wrench includes a suitable handle portion such as 101 and a head 102. The head is formed with an upper internal bore 103 for reception of the lower end of the handle 101, and may be apertured as at 104 to receive a securing pin or other suitable locking device. Bore 103 may be formed to receive any type of wrench handle such as a hex or square L wrench. Below the upper bore 103 is a pin bore 105 of a diameter sufficient to receive the head 35 of the stripper pin of Figures 4 or 15. The wrench head is cut away as at 106 and the head terminates in a pair of engaging dogs 107 and 108 having internal flat surfaces 109 and 110 respectively. The dogs may terminate short of the external surface of the wrench head as at 111 and 112. The distance between flat surfaces 109 and 110 is less than the diameter of the upper end 35 of the pin but greater than the distance between the milled flats 39a and 39b. The distance of maw 113 between the top of the dogs and the lower end of the cut away portion 106 is somewhat longer than the head of the stripper pin so that dogs 107 and 108 will slide over the milled flats.

The use and operation of my device is as follows:
Stripper or ejector assemblies are widely used in the molding and casting arts to separate molded or cast objects from their forming surfaces. In a shell mold machine for example, the mold surface is usually formed with holes in which stripper pins are received. After the sand and resin mixture has set, the pins move into the mold cavity to impinge on the mold or core and separate it from the forming surface. In many permanent mold operations including the shell molding process the mold must be kept heated in order to either insure against premature solidification of the material cast therein, as in die casting, or to cure the material cast therein, as in the shell mold process. In shell molding, if the length of the ejector pin varies, it may project above the mold forming surface forming an objectionable indentation in the finished mold surface. Likewise if the stripper pin does not expand as rapidly as the mold the shell mold may be formed with a projecting dimple which must be removed before the mold can be poured.

Another frequent source of trouble in permanent mold machines is the fact that stripper and ejector pins bind and warp if the pins are fixed with respect to the contour forming surface with which they are in engagement. This misalignment may be due to heat or normal wear, or a combination of these factors.

In Figures 1 through 9 I have shown one form of my invention in which the stripper pin 34 is carried by a base 42 which in turn is loosely carried by a bracket 50. The bracket is tightly secured to a pin base mounting plate 32 or other anchoring means. The pin is not connected directly to the base but is in engagement with a coil insert 60 which in turn is threadably received in the pin base 42. A floating action is imparted to the pin by a difference in diameter between the shank 43 of the pin base and the bore 59 in the pin bracket and also by a difference in diameter between the upper end of the pin and the pattern and adapter plate apertures 13 and 19. In order to provide vertical adjustment, a drive pin 39 may be inserted in the drive pin hole 38 and the wrench of Figure 10 slipped over the head end of the pin. The large offset of the crank 65 permits very accurate adjustment. Once in adjustment unintended axial displacement is provided by the binding action of the internally deformed turns of the coil insert 60 which form pressure points along the engaging turns of the pin thread.

In Figures 11 and 12 a modification is shown in which the stripper pin base 70 is formed with parallel top and bottom surfaces and two bores 71 and 72 which receive the securing bolts 73 and 74. The bolts do not hold the pin base rigidly to the base plate 32. A difference in diameter between the shank portion 76 of the bolts and the bores permits a sidewise floating action. A slight clearance, which has been exaggerated in the figures, between the bottom of the head of the bolt and the top of the base prevents binding of the base due to warpage or other causes. The base plate (or stripper plate) has been apertured as at 33 to receive the pin if it is necessary to adjust the pin so that its lower end projects below the bottom of the base. Since the height of the stripper pin base is correspondingly less than the embodiment shown in Figure 2 the coil insert is shown as extending substantially throughout the entire length of the internal bore 78 of the stripper pin base and the coil insert 80 has a deformed internal thread. This deformed thread will be reformed by the threads on the lower end of the striper pin and provide a gripping action.

In Figures 13 and 14 I have shown another modification of my invention in which the coil insert is entirely eliminated. As the pin is turned into the threaded bore 94 a binding action is created when the lower end 37 passes notch 95 and engages the thread below the notch. This binding action is due to the fact that the axes of the portions of the threaded bore above and below the notch are displaced with respect to one another. Again the difference in diameter between the internal bores 91 and 92 of the stripper pin base and the diameters of the shank portions of the securing bolts provides a sidewise floating action. Again a clearance is provided to prevent binding of the base to the base plate.

In order to adjust the stripper pins vertically either one of two methods may be used.

In Figures 1, 4 and 10 I have illustrated a pin and wrench assembly in which a wrench comprising an offset handle 66 and a head 67 slips over the head end 35 of a stripper pin. An indentation 69 in the wrench head engages drive pin 39 in the upper end of the pin. The bore 68 of the wrench head will be at least equal to and preferably slightly longer than the distance between the upper side of the drive pin and the top of the stripper pin. With the large leverage permitted by the handle 66 of the wrench it is an easy matter to adjust the stripper pin any desirable amount upwards or downwards.

Figure 20:
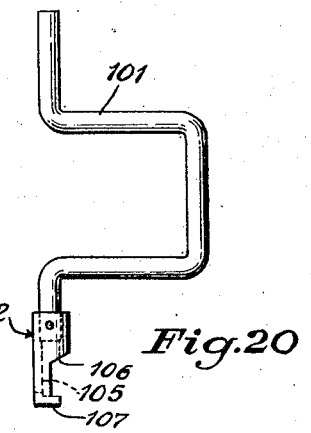
Figure 20 is another form of adjusting wrench.

In Figures 15 through 20 a second form of vertical adjustment is shown. The stripper pin has a pair of milled flats 39a and 39b which fit between a pair of engaging dogs 107 and 108 on the bottom of the pin wrench head 102 shown in Figure 20. The maw 113 fits over the top of the stripper pin 35 and with only a slight clearance between the internal faces 109 and 110 of the dogs and the milled flats, a positive gripping action is assured. It will be understood that either form of vertical wrench adjustment may be used with the stripper pins in any one of the various base mounting assemblies shown in Figures 2, 11 or 13. Furthermore many of the parts of my system are interchangeable. The pin adjustment wrenches may have any type of suitable handle, and the offset crank wrenches shown in the drawings is merely one of several possible types. The crank speed wrench of Figure 10 is especially useful if there is ample working space available. In more confined spaces such as core boxes, a hexagonal L wrench may be used as a handle. In this case the internal bore 103 in the head 102 of the wrench shown in Figure 20 is formed with a hex hole, so that the L wrench may be inserted directly in to the hole. If the space permits, a speed wrench handle having a hex shank welded on its lower end adapted to be received within the hex hole 103 may be used. It will also be understood that instead of a hex hole a square hole could be formed for use with a square section L wrench or a speed wrench handle having a square shank. Any suitable retaining means may be used to secure the head 102 to the wrench such as a conventional spring ball retainer.

It is also possible to use an open end wrench on the slab-sided pins of Figure 15 or a plain drift pin in the hole 38 of the stripper pin shown in Figure 4.

It should also be understood that the base mounting plate 32 shown in Figures 1, 2, 3, 11, 12 and 13 is not an absolute necessity. Such a plate with the use of a complete set of pin bases can be removed intact from the machine at the same time. It is possible to mount the pin bases directly on to the stripper plate of the machine, but the stripper plate is not easily removable as it is a part of the machine. If the pin bases are mounted directly on the stripper plate each pin base has to be individually removed and reinstalled at each set up.

For convenience of description, my assemblies have been described in conjunction with shell molding apparatus, but it will be understood that they are capable of wide application. They may be used in all instances in which it is necessary to provide some play between one end of a relatively fixed elongated member that is confined in another portion. For example, my assembly may be used in plastic injection molding, die casting and other foundry casting and molding methods, as well as the shell molding process.

It will be understood that the foregoing description of my invention is intended to be illustrative only and not definitive. Accordingly, I do not wish my invention to be limited except by the scope of the following appended claims.

I claim:

1. An adjustable, floating ejector assembly for molding and casting machines and the like including an ejector assembly support structure adapted for relative movement with respect to a member having a contour forming surface, an ejector assembly carried by the ejector assembly support structure including an ejector base adapted to receive one end of an ejector, and means for securing the ejector base to the ejector assembly support structure to permit slight relative movement of the one end of the ejector with respect to the support structure.

2. An adjustable, floating ejector assembly for molding and casting machines and the like including an ejector assembly support structure adapted for relative movement with respect to a member having a contour forming surface, an ejector assembly carried by the support structure including an ejector base adapted to receive one end of an ejector, means for securing the ejector to the ejector base, and means for connecting the ejector base to the ejector assembly support structure to permit slight relative movement of the one end of the ejector with respect to the support structure in at least a horizontal direction.

3. The ejector assembly of claim 2 further characterized in that the means for connecting the ejector base to the ejector assembly support structure includes means to permit slight relative movement of the ejector and ejector base as a unit with respect to the support structure in at least a horizontal direction.

4. An adjustable, floating, pin assembly adapted for use in casting and molding machines including a pin having one end adapted for reciprocation along a generally confined path and the other end adapted for connection to a support structure, the support structure being adapted for reciprocation along a predetermined path to thereby cause reciprocation of the one end of the pin along its generally confined path, and means for connecting the other end of the pin to float with respect to the support structure.

5. The assembly of claim 4 further characterized by and including locking means disposed between the other end of the pin and the support structure adapted to resist relative movement of the pin away from the support structure.

6. The assembly of claim 5 further characterized in that the locking means includes a member adapted to receive the other end of the pin and in turn to be received by the connecting means.

7. The assembly of claim 5 further characterized in that the locking means includes a deformed bore in the connecting means adapted to receive the other end of the pin.

8. The pin assembly of claim 4 further characterized in that the connecting means includes a base adapted to receive the other end of the pin, and a hold down structure adapted to permit a limited travel in all directions of the base and pin, the hold down structure being in turn rigidly secured to the support structure.

9. The assembly of claim 4 further characterized by and including adjusting means for positioning the pin with respect to the support structure.

10. The assembly of claim 9 further characterized in that the adjusting means includes a member engageable with and projecting from the pin adapted to engage an adjusting mechanism to thereby displace the pin along its longitudinal axis.

11. The assembly of claim 9 further characterized in that the adjusting means includes at least one flat surfaced indentation on the body of the pin adapted for engagement with an adjusting mechanism to thereby displace the pin along its longitudinal axis.

12. A floating and self-locking adjustable stripper pin assembly for molding and casting machines and the like including a stripper pin adapted to reciprocate along a confined path of travel at its upper end, a support structure, and a stripper pin base connecting assembly adapted to connect the lower end of the pin to the support structure, the connecting assembly including a pin base adapted to receive the lower end of the stripper pin, a securing and hold down member adapted to receive and confine the movement of the pin base, and securing means for securing the hold down structure to the support structure, the pin base having a portion received within and projecting from a passage in the hold down structure, said passage being slightly larger than the projecting portion of the pin base.

13. The assembly of claim 12 further including a coil insert adapted to be received in the pin base and to in turn receive the lower end of the stripper pin to thereby lock the stripper pin from unintended axial movement with respect to the pin base.

14. The assembly of claim 13 further characterized by and including means for adjusting the axial position of the stripper pin with respect to the pin base, said means including at least one projecting member adapted to be received within a cavity in the upper end of the stripper pin, the projecting member being adapted for engagement with a torque mechanism adapted to transmit torque through the projecting member to the stripper pin.

15. A floating and self-locking adjustable stripper pin assembly for molding and casting machines and the like including a stripper pin adapted to reciprocate along a confined path of travel at its upper end, a support structure, and a stripper pin base connecting assembly adapted to connect the lower end of the pin to the support structure, the connecting assembly including a pin base adapted to receive the lower end of the stripper pin, said pin base having a bore for the reception of the lower end of the pin extending throughout substantially the entire length of the pin base including an upstanding projecting portion, the axis of the bore in the upstanding projection being canted with respect to the axis in the lower portion of the bore, securing members engageable with the support structure for securing the pin base to the support structure, the securing members being received within and extending through hold down bores in the pin base, the hold down bores having a slightly greater diameter than the diameter of the securing members whereby movement of the pin base with respect to the support structure is permitted to the extent of the difference in diameters.

16. A floating and self-locking adjustable stripper pin assembly for molding and casting machines and the like including a stripper pin adapted to reciprocate along a confined path of travel at its upper end, a support structure having a recess therein and a stripper pin base connecting assembly adapted to connect the lower end of the pin to the support structure, the connecting assembly including a pin base adapted to receive the lower end of the stripper pin in a bore aligned with the recess in the support structure, and hold down and securing means received within hold down bores in the pin base and extending into the support structure, the hold down and securing means including members having a portion of a diameter slightly less than the diameter of the hold down bores in the pin base to thereby permit relative movement between the pin base and the support structure at least to the extent of the difference in diameters.

17. The assembly of claim 16 further characterized by and including a coil insert adapted to be received within the bore in the pin base and adapted to receive the lower end of the stripper pin, the internal threads of the coil insert being irregularly formed and having projecting portions to thereby exert increased frictional forces at the points of contact between the projecting portions and the stripper pin.

18. In a stripper pin assembly adapted for use in casting and molding machines and the like wherein a support structure including a connecting means is adapted to move relative to a contour forming surface, a stripper pin adapted for reception in the connecting means, the stripper pin including a head end adapted for movement into and through the contour forming surface and a lower end adapted for connection to the connecting means.

19. The assembly of claim 18 further characterized by and including a projecting member adapted for reception in the upper end of the pin and extending transverse to the axis of the pin.

20. The assembly of claim 18 further characterized in that the pin includes at least one flat recess formed in the side of the pin, the recess being parallel to the longitudinal axis of the pin near the head end thereof and adapted for engagement with an adjusting tool.

21. An ejector assembly for molding and casting machines and the like including an ejector assembly support structure adapted for relative movement with respect to a member having a contour forming surface, an ejector assembly including an ejector carried by the ejector assembly support structure, and means for connecting the ejector assembly to the ejector assembly support structure to permit slight relative movement of the one end of the ejector assembly with respect to the support structure.

22. The assembly of claim 12 further characterized in that the stripper pin is adapted to be received within a deformed bore in the stripper pin base connecting assembly to thereby lock the stripper pin from unintended axial movement with respect to the pin base.

23. A floating and self-locking adjustable stripper pin assembly for molding and casting machines and the like including a stripper pin adapted to reciprocate along a confined path of travel at its upper end, a support structure, and a stripper pin base connecting assembly adapted to connect the lower end of the pin to the support structure, the connecting assembly including a pin base adapted to receive the lower end of the stripper pin, a securing and hold down member adapted to receive and confine the movement of the pin base, and securing means for securing the hold down structure to the support structure, the pin base having a portion received within a passage in the hold down structure, said passage being slightly larger than the projecting portion of the pin base.

24. A floating and self-locking adjustable stripper pin assembly for molding and casting machines and the like including a stripper pin adapted to reciprocate along a confined path of travel at its upper end, a support structure, and a stripper pin base connecting assembly adapted to connect the lower end of the pin to the support structure, the connecting assembly including a pin base adapted to receive the lower end of the stripper pin, said pin base having a bore for the reception of the lower end of the pin extending throughout substantially the entire length of the pin base, the axis of the bore in the upper portion of the pin base being canted with respect to the axis in the lower portion of the bore, securing members engageable with the support structure for securing the pin base to the support structure, the securing members being received within and extending through hold down bores in the pin base, the hold down bores having a slightly greater diameter than the diameter of the securing members whereby movement of the pin base with respect to the support structure is permitted to the extent of the difference in diameters.

References Cited in the file of this patent

UNITED STATES PATENTS

| | | |
|---|---|---|
| 1,611,869 | Anderson | Dec. 28, 1926 |
| 2,787,815 | Granade | Apr. 19, 1957 |
| 2,837,796 | Aliberti | June 10, 1958 |